United States Patent [19]

Thul

[11] Patent Number: 5,277,220

[45] Date of Patent: Jan. 11, 1994

[54] COVERING SURROUND FOR SANITARY WATER FITTINGS ESPECIALLY FOR CONCEALED FITTINGS

[75] Inventor: Alfons Thul, Mehren, Fed. Rep. of Germany

[73] Assignee: Ideal-Standard GmbH, Bonn, Fed. Rep. of Germany

[21] Appl. No.: 867,119

[22] PCT Filed: Oct. 22, 1991

[86] PCT No.: PCT/EP91/02001

§ 371 Date: Jul. 2, 1992

§ 102(e) Date: Jul. 2, 1992

[87] PCT Pub. No.: WO92/08071

PCT Pub. Date: May 14, 1992

[30] Foreign Application Priority Data

Nov. 2, 1990 [DE] Fed. Rep. of Germany ....... 4034898

[51] Int. Cl.$^5$ .............................................. F16L 5/00
[52] U.S. Cl. .................... 137/359; 137/801; 4/675; 4/DIG. 7
[58] Field of Search .................... 137/359, 801; 4/675, 4/DIG. 7

[56] References Cited

U.S. PATENT DOCUMENTS

| 35,515 | 6/1862 | Gibson et al. | 137/359 |
| 1,436,027 | 11/1922 | Ferris | 137/359 |
| 1,516,594 | 11/1924 | Fischer | 137/359 |
| 2,708,449 | 5/1955 | Keithley | 137/359 |
| 3,199,121 | 8/1965 | Greto | 4/675 |
| 4,407,023 | 10/1983 | Norton | 4/675 |
| 4,672,994 | 6/1987 | Ko | 137/359 |
| 5,161,567 | 11/1992 | Humpert | 137/359 |

*Primary Examiner*—A. Michael Chambers
*Attorney, Agent, or Firm*—Sixbey, Friedman, Leedom & Ferguson

[57] ABSTRACT

The disadvantages of existing cover surrounds for wall-mounted bathroom fittings are avoided by the invention by virtue of the fact that the cover surround comprises an inner supporting plate (10) fastened to the wall (7) and an outer cover plate (11). The inner supporting plate (10) is preferably designed to be held in place by fixation means (13), while the outer cover plate (11) can be clipped over the inner supporting plate (10), thus concealing the fixation means (13) used to fasten the supporting plate (10).

6 Claims, 3 Drawing Sheets

5,277,220

COVERING SURROUND FOR SANITARY WATER FITTINGS ESPECIALLY FOR CONCEALED FITTINGS

BACKGROUND OF THE INVENTION

The invention relates to a covering surround for sanitary water fittings especially for concealed fittings.

As is generally known, concealed fittings, except for the operating element or operating elements, e.g., handles, levers, push buttons used for switching etc., are present in the plumbing wall. The covering of the installation opening and thus, of the concealed fittings together with their connections, takes place by a correspondingly large covering surround, which, as a rule, is connected by screws with the fittings body. The covering surround is braced, in this case, by interpositioning of an outside sealing ring on the plumbing wall, namely in the area of the edges of the installation opening.

It is disadvantageous in the known covering surrounds for sanitary water fittings, especially for concealed fittings, that the screw heads of the screws, to which the known covering surrounds are connected with the fittings body, remain visible. Apart from visual aesthetic drawbacks, the danger exists that during the insertion of the screws in the fittings body, the screw heads and the covering surround itself are damaged by scraping; fairly often even deformations of the covering surround occur. In addition, the maintenance of the covering surrounds is made more difficult in the area of the screw heads.

SUMMARY OF THE INVENTION

The object of the invention now is to indicate a covering surround freed from the above-described drawbacks.

The covering surround for sanitary water fittings according to the invention, especially for concealed fittings, in which the object explained and described above is achieved, is now first and basically characterized by an inner holding plate and an outer cover plate braced on the plumbing wall. Preferably, in the covering surround according to the invention, the inner holding plate is designed for the engagement of fasteners and the outer cover plate can be latched with the inner holding plate, and then, the outer cover plate covers the fasteners engaging the inner support plate.

In detail there are now various possibilities to configure and further develop the covering surround for sanitary water fittings, and which will be apparent from the following description and accompanying drawing which show, for purposes of illustration, a single embodiment in accordance with a preferred form of the present invention according to the invention, especially for concealed fittings.

BRIEF DESCRIPTION OF THE DRAWINGS

In FIG. 1, concealed fitting 6 is shown diagrammatically, placed in plumbing wall 7 and is connected by relief and stop valve 8 to a water pipe, not shown.

Figure 1:
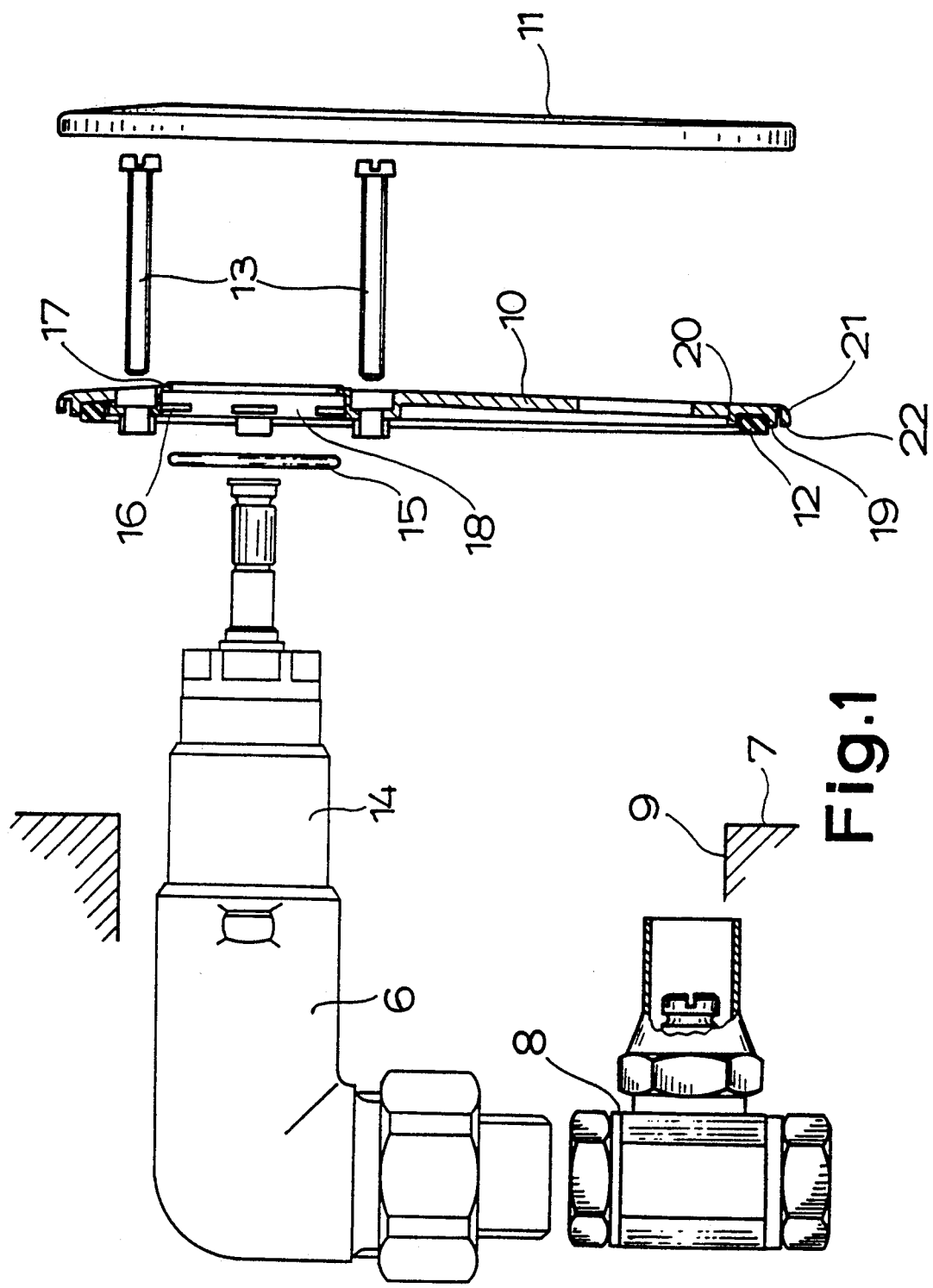
FIG. 1 is an exploded representation of a sanitary concealed fitting with a covering surround according to the invention.

To cover installation opening 9 provided in plumbing wall 7, and thus concealed fitting 6 and relief and stop valve 8, the covering surround according to the invention is now used which consists of an inner holding plate 10 braced on plumbing wall 7 and an outer cover plate 11. In this case, inner holding plate 10 is sealed by sealing ring 12 relative to plumbing wall 7, and designed for receiving fasteners 13. Outer cover plate 11 can be latched with support plate 10, and covers the fasteners 13 passed through the inner support plate 10. In the represented embodiment, screws are provided as fasteners 13, corresponding tapholes are not shown. During bolting, holding plate 10 of the covering surround according to the invention is pushed over cover sleeve 14 of concealed fitting 6. The sealing between cover sleeve 14 of concealed fitting 6 and holding plate 10 of the covering surround according to the invention takes place by sealing ring 15, which is placed between ribbing 16 and inner collar 17 in opening 18 of holding plate 10.

Figure 2:
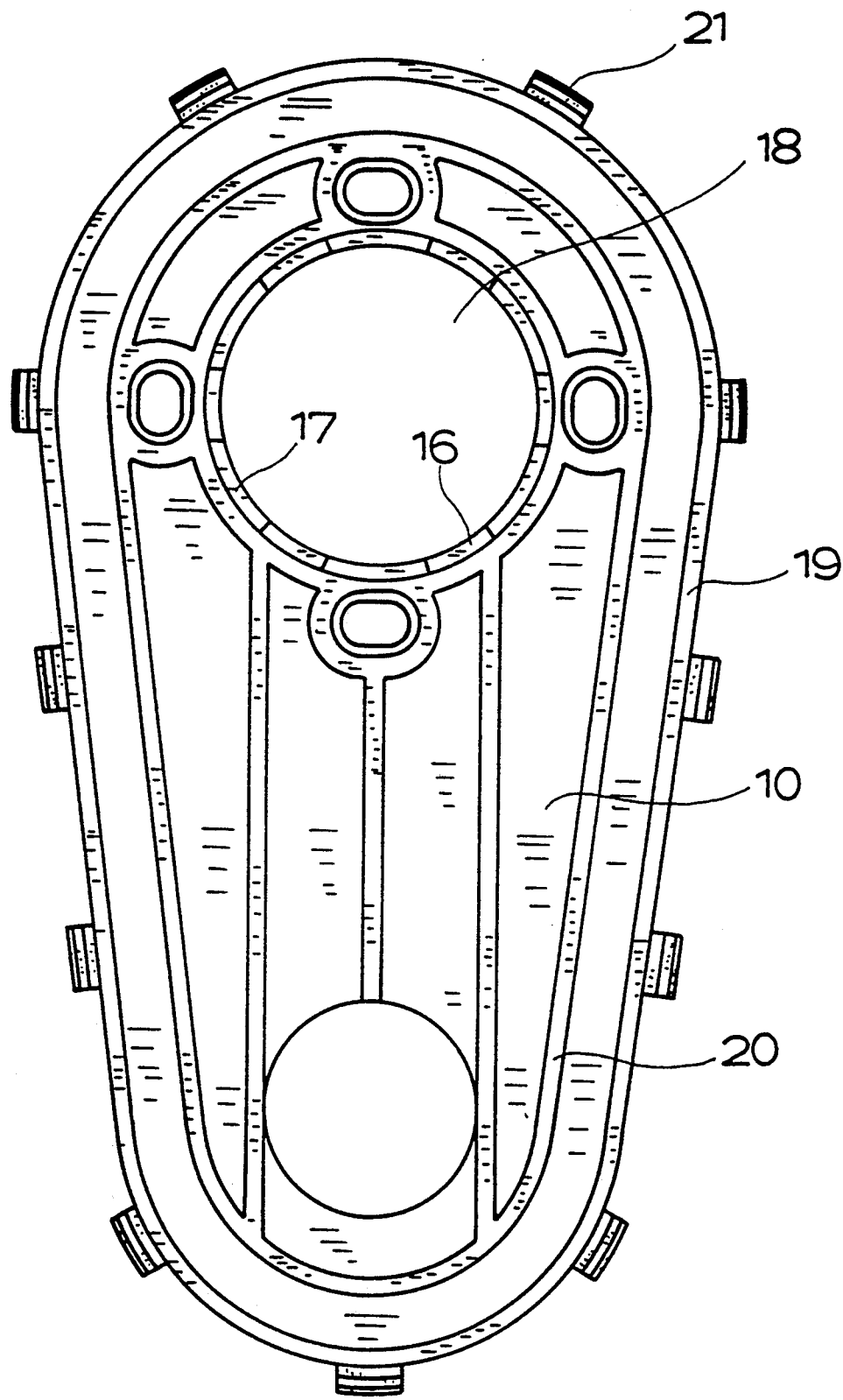
FIG. 2 is the holding plate of the covering surround according to the invention, viewed from behind.
Figure 3:
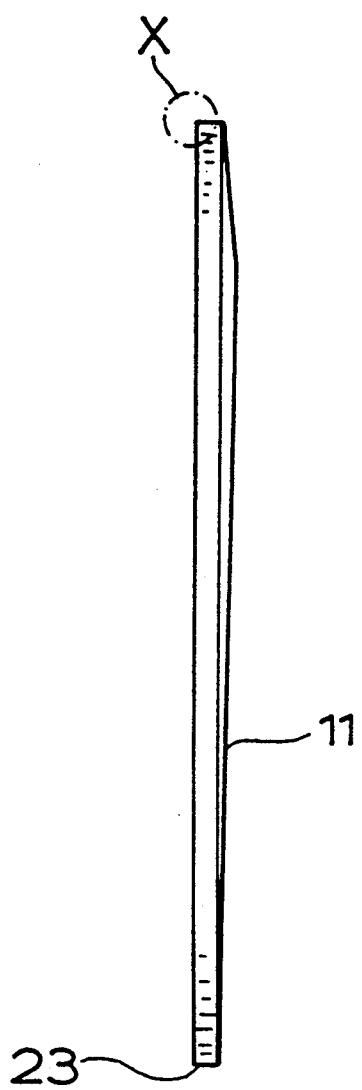
FIG. 3 is a longitudinal section through the cover plate of the covering surround according to the invention.
Figure 4:
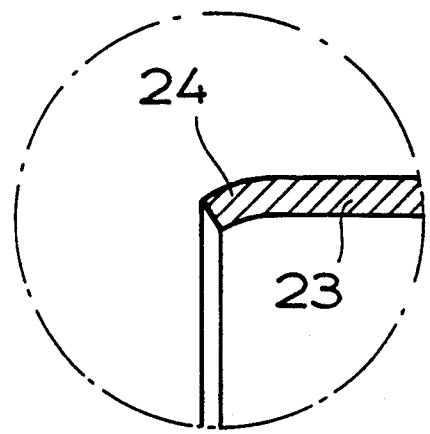
FIG. 4 is an enlarged view of detail X of the cover plate shown in FIG. 3 of the covering surround according to the invention.
Figure 5:
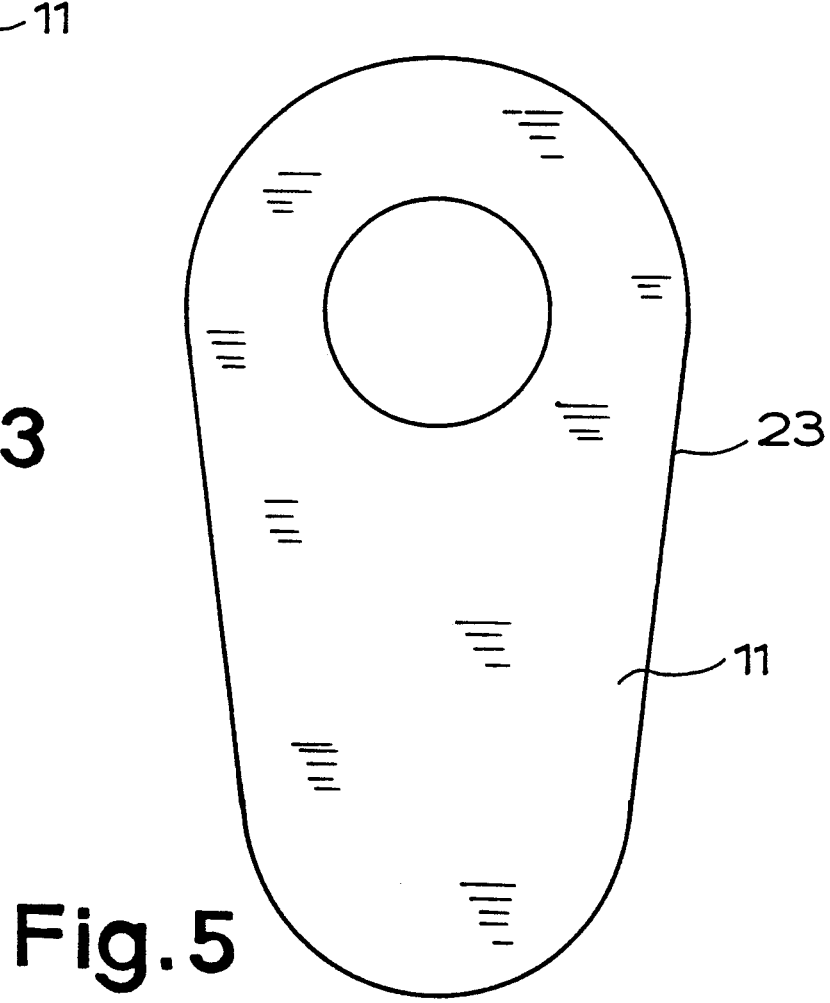
FIG. 5 shows the cover plate of the covering surround according to the invention, viewed from behind.

As can be seen in FIGS. 1 and 2, holding plate 10 of the covering surround according to the invention is braced on plumbing wall 7 by outer support edge 19 and inner support edge 20 as well as by sealing ring 12; in this case sealing ring 12 is held between support edges 19, 20.

It has already been pointed out above that, in the covering surround according to the invention, outer cover plate 11 can be latched with inner holding plate 10. For this purpose, tab-like projections 21 with flexible properties are present, in the represented embodiment, on outer support edge 19 of holding plate 10. Tab-like projections 21 are set back relative to support edge 19; thus, free ends 22 of tab-like projections 21 do not come in contact with plumbing wall 7. To latch cover plate 11 with holding plate 10, the tab-like projections 21 of holding plate 10 interact with clamping edge 23 of cover plate 11; tab-like projections 21 flexibly pressing on clamping edge 23 of cover plate 1. In a latched condition, cover plate 1 is at a distance from plumbing wall 7. End area 24 of clamping edge 23 of cover plate 11 facing plumbing wall 7 is bent inward to ensure the latching. Since clamping edge 23, in the latched position of cover plate 11, is at a distance from plumbing wall 7, cover plate 11 can easily be disengaged with a tool, so that hidden fasteners 13 are always accessible for optionally necessary maintenance and/or repair work.

The covering surround according to the invention, previously described in connection with a concealed fitting 6, is not limited to use in connection with concealed fittings. Rather, the covering surround according to the invention can be used even in water fittings, which are mounted on washstands, bidets, bathtubs, etc. Thus, it is usual, e.g., in the USA, to provide the fitting bank of washstands with three holes, to be able to optionally install a three-hole fitting. If, however only a one hole fitting, for example in the form of a one-lever mixer or a two-handle mixer, is desired, the other two holes have to be closed. Then, that can take place according to the invention with a continuous inner holding plate or with two separate inner holding plates, which is or are connected with the fitting bank. Then, a cover plate or cover plates can be latched again with the holding plate or holding plates.

I claim:

1. Covering surround for sanitary water fittings especially for concealed fittings, comprising an inner holding plate and an outer cover plate being braced on a plumbing wall; wherein the holding plate has an outer support edge; wherein tab-like projections with flexible properties are provided on the outer support edge of the holding plate, said tab-like projections serving to latch the cover plate with the holding plate; wherein the tab-like projections are set back relative to the support edge of the holding plate; and wherein the cover plate has an outer clamping edge, and the tab-like projections of the support edge of the holding plate lie flexibly against the clamping edge of the cover plate.

2. Covering surround according to claim 1, wherein the inner holding plate is designed for engaging fasteners.

3. Covering surround according to claim 2, wherein the outer cover plate covers the fasteners engaging the inner support plate.

4. Covering surround according to claim 1, wherein the clamping edge of the cover plate is set back relative to the support edge of the holding plate.

5. Covering surround according to claim 4 wherein clamping edge of the cover plate is bent inward in its end area.

6. Covering surround for water fittings comprising an inner holding plate, said inner holding plate having openings for receiving fasteners for mounting of the inner holding plate, and an outer cover plate, said outer cover plate being mountable over said inner holding plate so as to conceal said inner holding plate; wherein resilient engaging members on peripheral edge areas of said inner holding plate and peripheral edge areas of said outer cover plate are configured relative to each other as a means for retaining the outer cover plate over the inner holding plate in a releasable manner by said resilient engaging members on the peripheral edge area of the inner holding plate pressing outwardly against the peripheral edge areas of the cover plate.

* * * * *